R. L. JONES
Apparatus for Digging Post Holes, &c.

117297  
PATENTED JUL. 25 1871

UNITED STATES PATENT OFFICE.

ROLLIN L. JONES, OF CLEVELAND, OHIO.

IMPROVEMENT IN POST-HOLE DIGGERS AND DITCHERS.

Specification forming part of Letters Patent No. 117,297, dated July 25, 1871.

*To all whom it may concern:*

Be it known that I, ROLLIN L. JONES, of Cleveland, in the county of Cuyahoga and State of Ohio, have invented a certain new and Improved Machine for making Ditches, Drains, Trenches, Post-Holes, and Transplanting; and I hereby declare the following to be a full, clear, and complete description of the same, reference being had to the accompanying drawing making part of this specification, in which—

Figure 1:
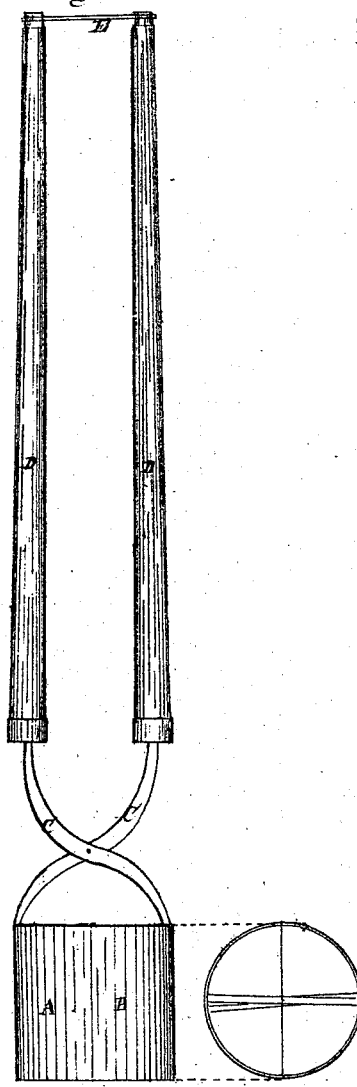
Figure 2:
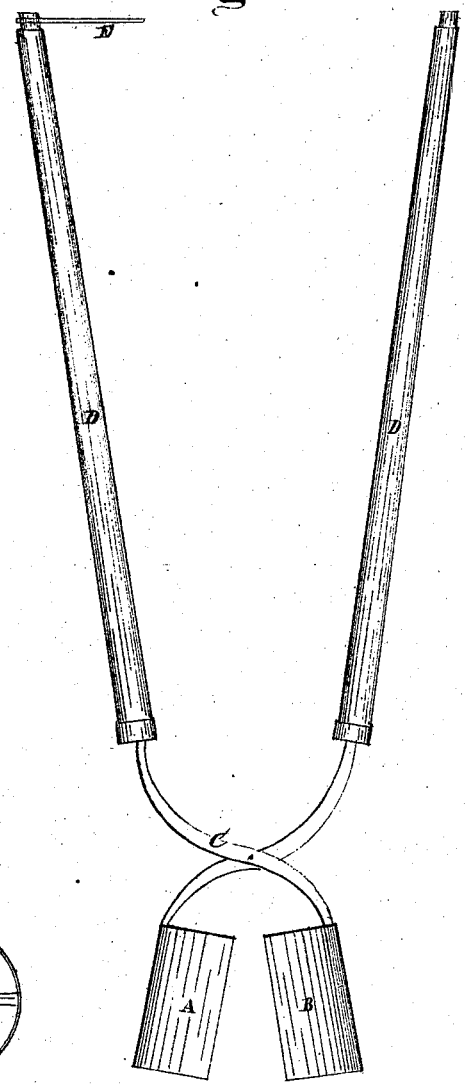

Figure 1 is a side view of the apparatus when closed. Fig. 2 is a side view of the same when open.

Like letters of reference refer to like parts in the several views.

The nature of this invention relates to an apparatus for digging post-holes, &c. Said apparatus consists of a pair of handles, to the end of each of which is secured a semicircular jaw by means of a pair of shanks pivoted to each other, which allows of said jaws being opened and closed, as hereinafter more fully set forth and described.

In the drawing, Fig. 1, A B represent the jaws of the apparatus, which consist of a plate of metal bent to a semicircle equal to about half the diameter of the hole to be made. The two sections or jaws are of equal size, and are connected to each other by the arms C, to which the upper edge is strongly attached, as shown in the drawing. The upper ends of the arms C are inserted in wooden handles D, thereby adding to their length, and whereby the apparatus is operated, as will presently be shown. The lower edge of the sections or jaws are brought to a cutting-edge. To the upper end of the handles is attached a yoke, E, whereby they are held together while the apparatus is being used.

The practical operation of this device is as follows: The jaws are brought close together, or nearly so, as shown in Fig. 1, and secured thus by the yoke E referred to. The operator now holds the implement by the handles and strikes it downward into the ground; the sharp edge of the jaws will cut its way down, cutting out a circular core of dirt, which is removed from the hole by compressing the handles, thereby closing the jaws upon the core or loose dirt, and whereby it can be lifted out from the hole to the top of the ground. Holes of various diameters can be made by this implement by working it with the jaws more or less open, as shown in Fig. 2. When thus used the implement is made to rotate and thereby cut down the blank left by the space between the jaws. By this apparatus post-holes can be easily and quickly dug, and of the exact size for the post, so that it can be driven down thereon, and be tight without setting the loose dirt in around it.

What I claim as my invention, and desire to secure by Letters Patent, is—

The machine for digging post-holes, transplanting, &c., when constructed and arranged in the form and manner substantially as specified.

ROLLIN L. JONES.

Witnesses:
W. H. BURRIDGE,
J. H. BURRIDGE.